United States Patent
Huang et al.

(10) Patent No.: US 12,003,296 B2
(45) Date of Patent: Jun. 4, 2024

(54) BEAMFORMING FOR MULTI-APERTURE ORBITAL ANGULAR MOMENTUM MULTIPLEXING BASED COMMUNICATION

(71) Applicant: QUALCOMM Incorporated, San Diego, CA (US)

(72) Inventors: Min Huang, Beijing (CN); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 17/997,213

(22) PCT Filed: Jul. 1, 2020

(86) PCT No.: PCT/CN2020/099634
§ 371 (c)(1),
(2) Date: Oct. 26, 2022

(87) PCT Pub. No.: WO2022/000357
PCT Pub. Date: Jan. 6, 2022

(65) Prior Publication Data
US 2023/0163822 A1    May 25, 2023

(51) Int. Cl.
*H04B 7/06*    (2006.01)

(52) U.S. Cl.
CPC ......... *H04B 7/0617* (2013.01); *H04B 7/0695* (2013.01)

(58) Field of Classification Search
CPC ........................... H04B 7/0617; H04B 7/0695
See application file for complete search history.

(56) References Cited

U.S. PATENT DOCUMENTS

| | | | |
|---|---|---|---|
| 10,917,179 B2 * | 2/2021 | Kudinov | G06T 7/74 |
| 2017/0353265 A1 | 12/2017 | Mansouri Rad et al. | |
| 2022/0278723 A1 * | 9/2022 | Yu | H04B 7/0617 |

(Continued)

FOREIGN PATENT DOCUMENTS

| | | |
|---|---|---|
| WO | WO-2019059406 A1 | 3/2019 |
| WO | WO-2020078473 A1 | 4/2020 |

OTHER PUBLICATIONS

International Search Report and Written Opinion—PCT/CN2020/099634—ISA/EPO—dated Mar. 25, 2021.

(Continued)

*Primary Examiner* — Janice N Tieu
(74) *Attorney, Agent, or Firm* — Harrity & Harrity, LLP (57) ABSTRACT

Various aspects of the present disclosure generally relate to wireless communication. In some aspects, a receiver of orbital angular momentum (OAM) multiplexing based communication may receive, from a transmitter of the OAM multiplexing based communication, a plurality of reference signals corresponding to a plurality of aperture pairs, wherein a reference signal of the plurality of reference signals corresponds to an OAM mode of a corresponding aperture pair; transmit, to the transmitter, a feedback message comprising beamforming information based at least in part on the plurality of reference signals; and receive, from the transmitter, a plurality of data streams that are beamformed based at least in part on the beamforming information. Numerous other aspects are provided.

35 Claims, 6 Drawing Sheets

(56) References Cited

U.S. PATENT DOCUMENTS

2023/0096819 A1* 3/2023 Ni .................. H04B 7/0639
343/702

OTHER PUBLICATIONS

Sasaki E., et al., "Pragmatic OAM with Polarization Multiplexing Transmission for Future 5G Ultra-High Capacity Radio," 2016, 46th European Microwave Conference (EuMC), Jan. 19, 2017 (Jan. 19, 2017), pp. 154-157, the whole document.
Tamagnone M., et al., "The Orbital Angular Momentum (OAM) Multiplexing Controversy: OAM as a Subset of MIMO," 2015, 9th European Conference on Antennas and Propagation (EuCAP), Oct. 29, 2015 (Oct. 29, 2015), 29 pages, the whole document.
Tang, H., et al. "Orbital Angular Momentum Multiplexing Under Partial Angular Aperture Receiving with Multiple Receiving Elements," 2019 Cross Strait Quad-Regional Radio Science and Wireless Technology Conference (CSQRWC), Aug. 15, 2019 (Aug. 15, 2019), 2 pages, the whole document.

* cited by examiner

BEAMFORMING FOR MULTI-APERTURE ORBITAL ANGULAR MOMENTUM MULTIPLEXING BASED COMMUNICATION

CROSS-REFERENCE TO RELATED APPLICATION

This Patent Application is a 371 national stage of PCT Application No. PCT/CN2020/099634 filed on Jul. 1, 2020, entitled "BEAMFORMING FOR MULTI-APERTURE ORBITAL ANGULAR MOMENTUM MULTIPLEXING BASED COMMUNICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for beamforming for multi-aperture orbital angular momentum (OAM) multiplexing based communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a receiver of orbital angular momentum (OAM) multiplexing based communication includes: receiving, from a transmitter of the OAM multiplexing based communication, a plurality of reference signals corresponding to a plurality of aperture pairs, wherein a reference signal of the plurality of reference signals corresponds to an OAM mode of a corresponding aperture pair; transmitting, to the transmitter, a feedback message comprising beamforming information based at least in part on the plurality of reference signals; and receiving, from the transmitter, a plurality of data streams that are beamformed based at least in part on the beamforming information.

In some aspects, a method of wireless communication performed by a transmitter of OAM multiplexing based communication includes: transmitting, to a receiver of the OAM multiplexing based communication, a plurality of reference signals corresponding to a plurality of aperture pairs, wherein a reference signal of the plurality of reference signals corresponds to an OAM mode of a corresponding aperture pair; receiving, from the receiver, a feedback message comprising beamforming information based at least in part on the plurality of reference signals; and transmitting, to the receiver, a plurality of data streams that are beamformed based at least in part on the beamforming information.

In some aspects, a receiver of OAM multiplexing based communication includes: a memory; and one or more processors operatively coupled to the memory, the memory and the one or more processors configured to: receive, from a transmitter of the OAM multiplexing based communication, a plurality of reference signals corresponding to a plurality of aperture pairs, wherein a reference signal of the plurality of reference signals corresponds to an OAM mode of a corresponding aperture pair; transmit, to the transmitter, a feedback message comprising beamforming information based at least in part on the plurality of reference signals; and receive, from the transmitter, a plurality of data streams that are beamformed based at least in part on the beamforming information.

In some aspects, a transmitter of OAM multiplexing based communication includes: a memory; and one or more processors operatively coupled to the memory, the memory and the one or more processors configured to: transmit, to a receiver of the OAM multiplexing based communication, a plurality of reference signals corresponding to a plurality of aperture pairs, wherein a reference signal of the plurality of reference signals corresponds to an OAM mode of a corresponding aperture pair; receive, from the receiver, a feedback message comprising beamforming information based at least in part on the plurality of reference signals; and transmit, to the receiver, a plurality of data streams that are beamformed based at least in part on the beamforming information.

In some aspects, a non-transitory computer-readable medium storing a set of instructions for wireless communication includes: one or more instructions that, when executed by one or more processors of a receiver of OAM multiplexing based communication, cause the receiver to: receive, from a transmitter of the OAM multiplexing based communication, a plurality of reference signals corresponding to a plurality of aperture pairs, wherein a reference signal of the plurality of reference signals corresponds to an OAM mode of a corresponding aperture pair; transmit, to the transmitter, a feedback message comprising beamforming information based at least in part on the plurality of reference signals; and receive, from the transmitter, a plurality of data streams that are beamformed based at least in part on the beamforming information.

In some aspects, a non-transitory computer-readable medium storing a set of instructions for wireless communication includes: one or more instructions that, when executed by one or more processors of a transmitter of OAM multiplexing based communication, cause the transmitter to: transmit, to a receiver of the OAM multiplexing based communication, a plurality of reference signals corresponding to a plurality of aperture pairs, wherein a reference signal of the plurality of reference signals corresponds to an OAM mode of a corresponding aperture pair; receive, from the receiver, a feedback message comprising beamforming information based at least in part on the plurality of reference signals; and transmit, to the receiver, a plurality of data streams that are beamformed based at least in part on the beamforming information.

In some aspects, an apparatus for OAM multiplexing based communication includes: means for receiving, from a transmitter of the OAM multiplexing based communication, a plurality of reference signals corresponding to a plurality of aperture pairs, wherein a reference signal of the plurality of reference signals corresponds to an OAM mode of a corresponding aperture pair; means for transmitting, to the transmitter, a feedback message comprising beamforming information based at least in part on the plurality of reference signals; and means for receiving, from the transmitter, a plurality of data streams that are beamformed based at least in part on the beamforming information.

In some aspects, an apparatus for OAM multiplexing based communication includes: means for transmitting, to a receiver of the OAM multiplexing based communication, a plurality of reference signals corresponding to a plurality of aperture pairs, wherein a reference signal of the plurality of reference signals corresponds to an OAM mode of a corresponding aperture pair; means for receiving, from the receiver, a feedback message comprising beamforming information based at least in part on the plurality of reference signals; and means for transmitting, to the receiver, a plurality of data streams that are beamformed based at least in part on the beamforming information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

Figure 1:
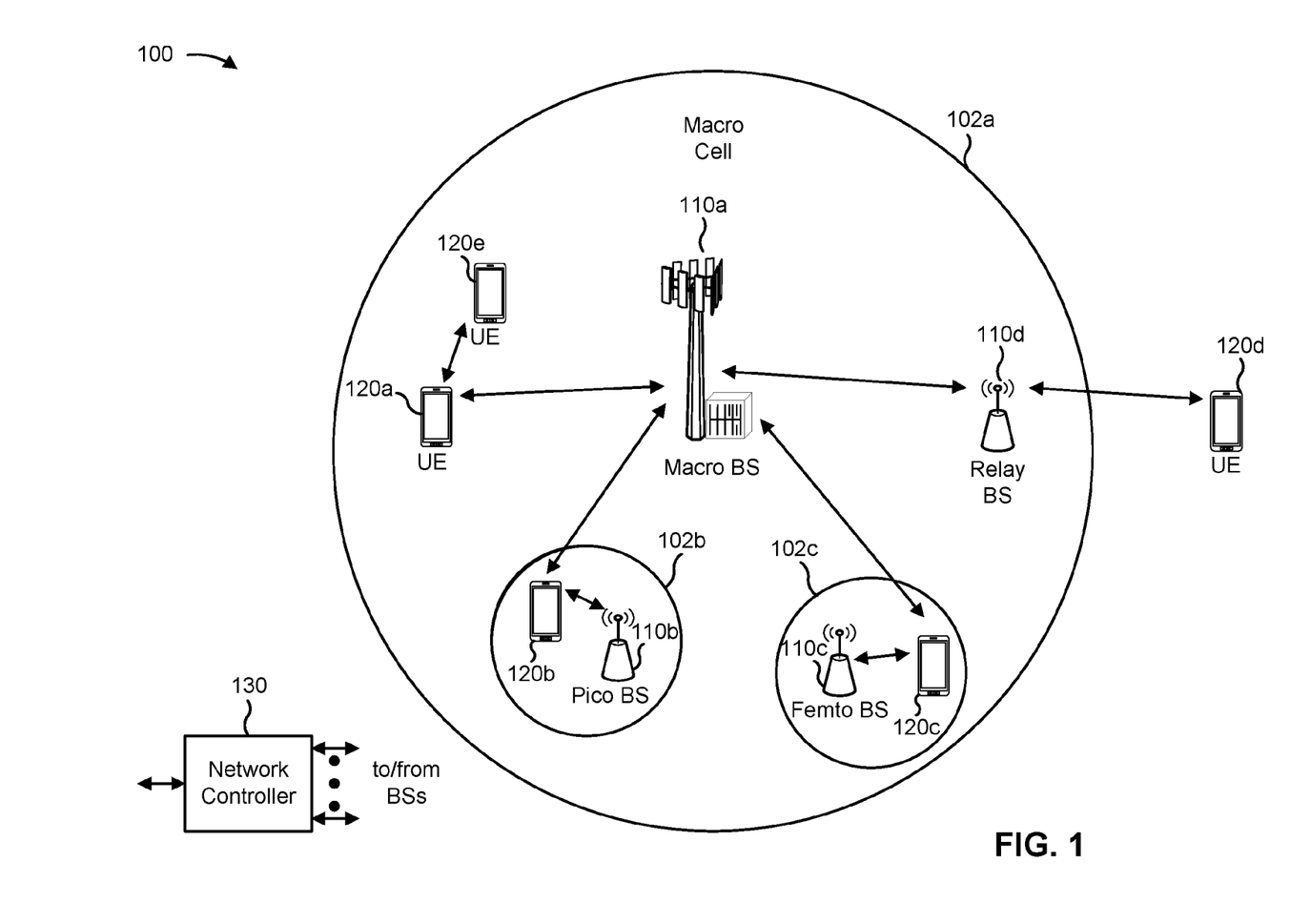
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband Internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
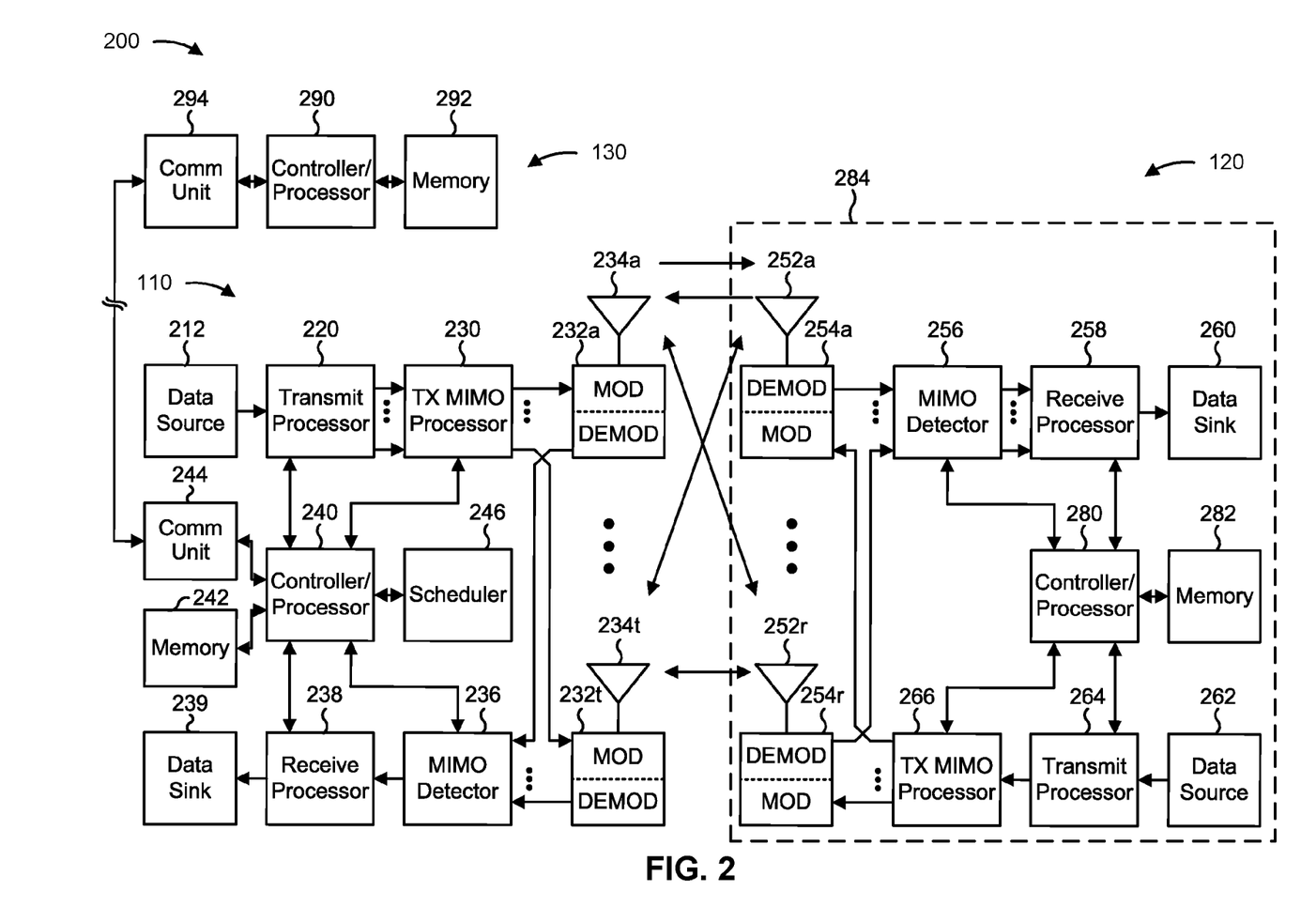
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-6.

Controller/processor 240 of base station 110, controller/processor 280 of UE 120, and/or any other component(s) of FIG. 2 may perform one or more techniques associated with beamforming for multi-aperture orbital angular momentum (OAM) multiplexing based communication, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, interpreting the instructions, and/or the like.

In some aspects, UE 120 may include means for receiving, from a transmitter of the OAM multiplexing based communication, a plurality of reference signals corresponding to a plurality of aperture pairs, wherein a reference signal of the plurality of reference signals corresponds to an OAM mode of a corresponding aperture pair, means for transmitting, to the transmitter, a feedback message comprising beamforming information based at least in part on the plurality of reference signals, means for receiving, from the transmitter, a plurality of data streams that are beamformed based at least in part on the beamforming information, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a receiver of the OAM multiplexing based communication, a plurality of reference signals corresponding to a plurality of aperture pairs, wherein a reference signal of the plurality of reference signals corresponds to an OAM mode of a corresponding aperture pair, means for receiving, from the receiver, a feedback message comprising beamforming information based at least in part on the plurality of reference signals, means for transmitting, to the receiver, a plurality of data streams that are beamformed based at least in part on the beamforming information, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
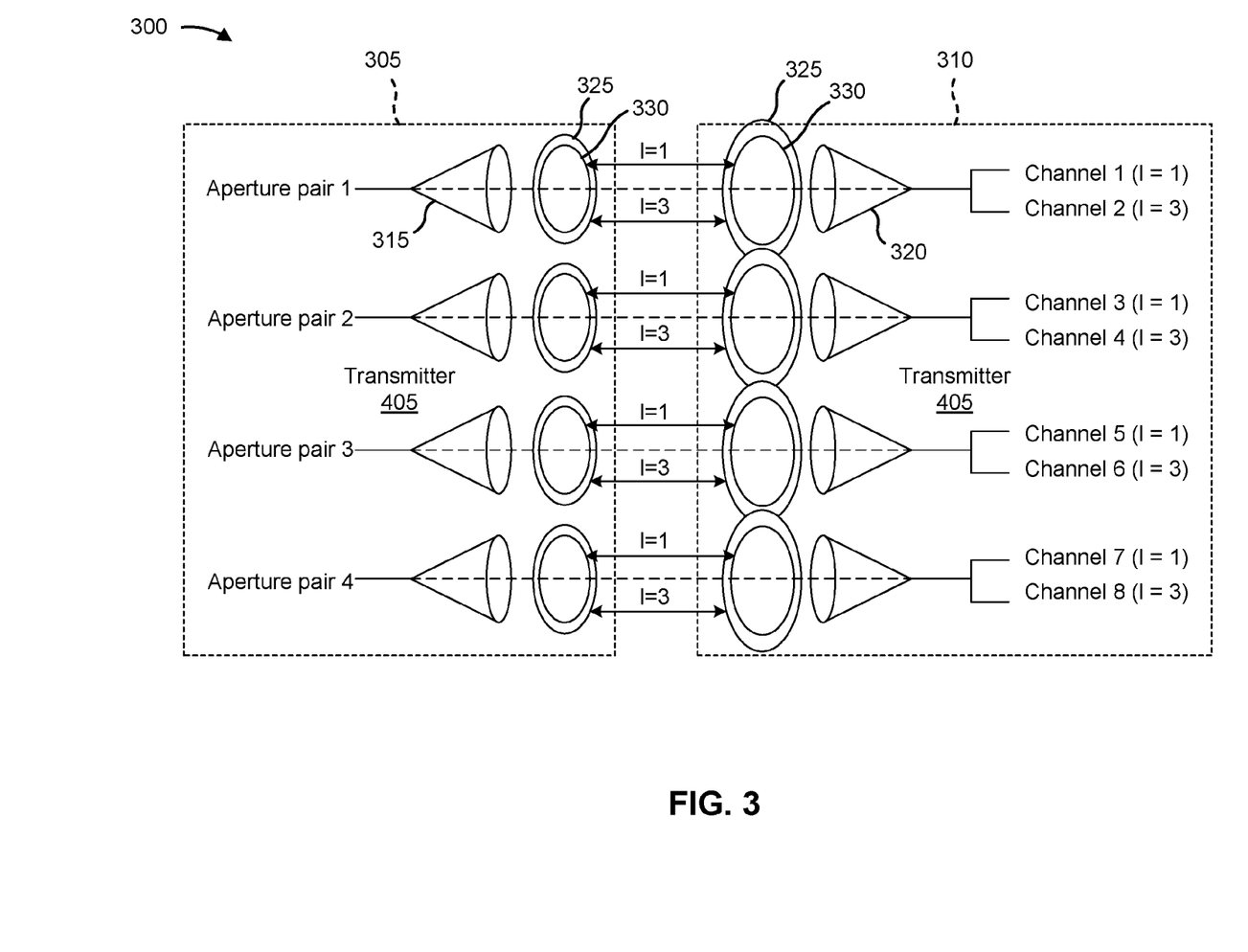
FIG. 3 is a diagram illustrating an example of multi-aperture orbital angular momentum (OAM) multiplexing based communication, in accordance with various aspects of the present disclosure.

FIG. 3 is a diagram illustrating an example 300 of multi-aperture OAM multiplexing based communication, in accordance with various aspects of the present disclosure. As shown, a transmitter 305 and a receiver 310 may communicate with one another using OAM multiplexing based communication. According to various aspects, the transmitter 305 and/or the receiver 310 may be implemented in connection with one or more UEs (e.g., the UE 120 shown in FIG. 1, and/or the like), one or more base stations (e.g., the base station 110 shown in FIG. 1, and/or the like), one or more vehicles having one or more onboard UEs, and/or the like.

Communication based on OAM multiplexing may provide high-order spatial multiplexing as a means to increasing high data rates. In OAM multiplexing based communication, the transmitter 305 may radiate multiple coaxially propagating, spatially-overlapping waves (OAM mode l= . . . , −2, −1, 0, 1, 2, . . . ) each carrying a data stream through a transmitter aperture 315 to a receiver aperture 320. An electromagnetic wave with a helical transverse phase of the form $\exp(i\varphi l)$ may be used to carry an OAM mode waveform, where $\varphi$ is the azimuthal angle and l is an unbounded integer (referred as the OAM order). Multiple OAM waves can be orthogonally transmitted using the same radio resources (time and/or frequency domains); thus, using OAM multiplexing can greatly improve communication spectrum efficiency.

To further increase the communication throughput, as shown in FIG. 3, multiple pairs of apertures (where each pair includes a transmitter aperture 315 and a corresponding receiver aperture 320) may be applied in parallel. In some cases, one pair of transmitter and receiver apertures can have M spatial-multiplexed channels (OAM modes), in which case, N pairs of apertures can have MN spatial multiplexed channels (OAM modes). The channels in one pair of apertures may be orthogonal and have no or trivial mutual interference. However, the channels in different pairs of apertures may be non-orthogonal and have mutual interference.

For example, as shown in FIG. 3, as a beam travels from the transmitter aperture 315 to the corresponding receiver aperture 320, the outer bound (referred to herein as a radiation circle) 325, 330 of each beam mode expands. As shown, radiation circles 325 associated with waves with higher-order modes (e.g., l=3) expand faster than radiation circles 330 associated with waves with lower-order modes (e.g., l=1). As a result, the mutual interference is more severe among higher-order modes than among lower-order modes, and may cause a reduction in throughput, signal reliability, signal quality, and/or the like.

According to various aspects of the techniques and apparatuses described herein, a receiver of OAM multiplexing based communication may provide feedback to a transmitter to facilitate beamforming. As a result, aspects may facilitate a reduction in mutual interference between modes, thereby leading to an increase in throughput, signal reliability, signal quality, and/or the like. In some aspects, the transmitter may transmit one or more reference signals to the receiver. The receiver may determine OAM mode groupings and combining coefficients based on the reference signals and may feed back those OAM mode groupings and combining coefficients to the transmitter as beamforming information. The transmitter may transmit to the receiver data streams that are beamformed based at least in part on the beamforming information. In this way, aspects may facilitate reducing interference between antennas used for OAM multiplexing based communication. As a result, aspects may facilitate increases in throughput, signal reliability, signal quality, and/or the like.

As indicated above, FIG. 3 is provided as an example. Other examples may differ from what is described with regard to FIG. 3.

Figure 4:
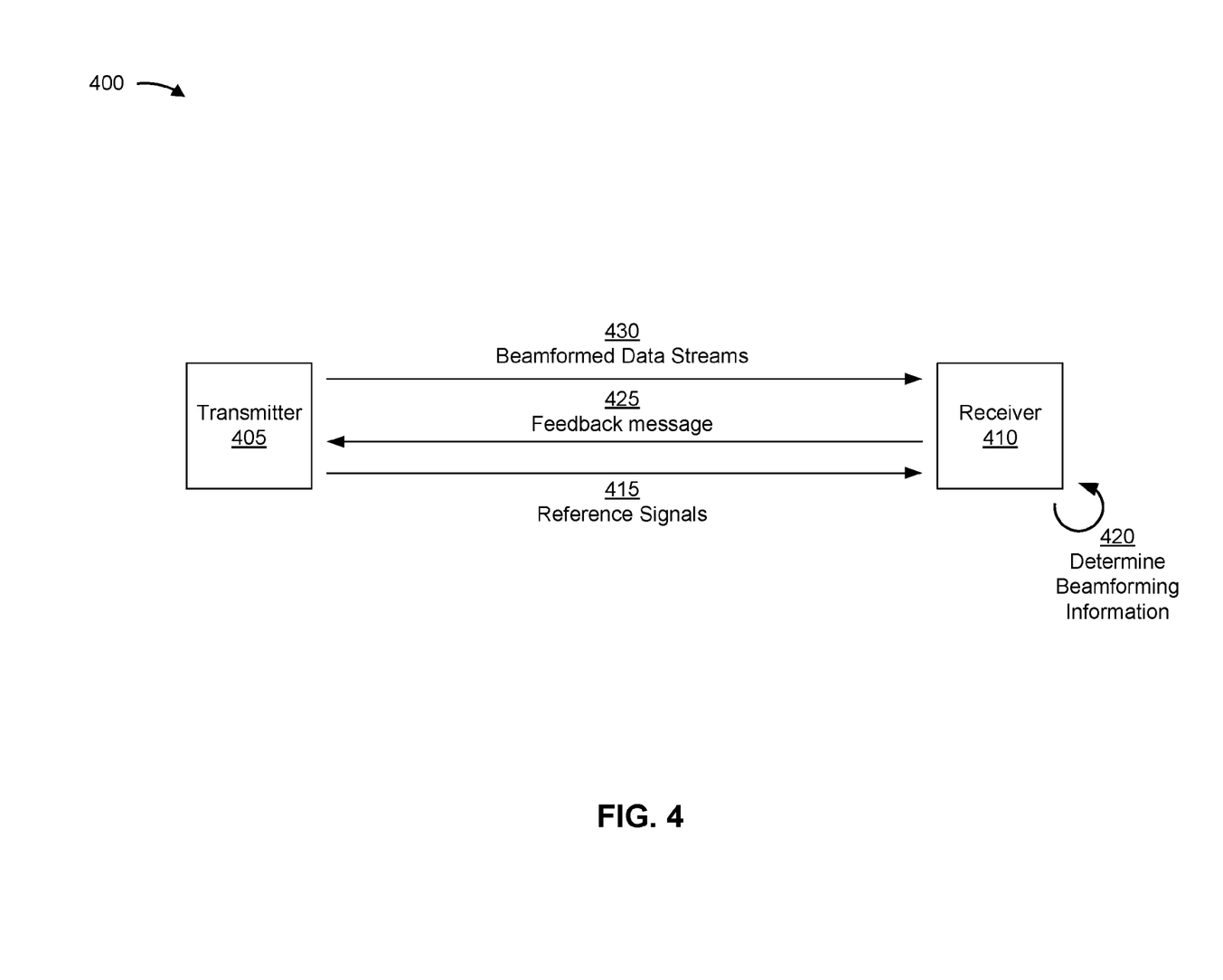
FIG. 4 is a diagram illustrating an example associated with beamforming for multi-aperture OAM multiplexing based communication, in accordance with various aspects of the present disclosure.

FIG. 4 is a diagram illustrating an example 400 associated with beamforming for multi-aperture OAM multiplexing based communication, in accordance with various aspects of the present disclosure. As shown, a transmitter 405 of OAM multiplexing based communication and a receiver 410 of OAM multiplexing based communication may communicate with one another.

In some aspects, the transmitter 405 may be, be similar to, include, or be included in the transmitter 305 depicted in FIG. 3, and the receiver 410 may be, be similar to, include, or be included in, the receiver 310 shown in FIG. 3. In some aspects, the transmitter 405 and/or the receiver 410 may be, be similar to, include, or be included in, a UE (e.g., UE 120 shown in FIG. 1), a base station (e.g., base station 110 shown in FIG. 1), and/or the like.

As shown by reference number 415, the transmitter 405 may transmit, and the receiver 410 may receive, a number of reference signals corresponding to a plurality of aperture pairs. In some aspects, each transmitter aperture may transmit one or more reference signals to a corresponding receiver aperture. In some aspects, a reference signal may correspond to an OAM mode of a corresponding aperture pair.

As shown by reference number 420, the receiver 410 may determine beamforming information. In some aspects, the beamforming information may be based at least in part on one or more of the reference signals. In some aspects, the receiver 410 may determine the beamforming information by determining one or more characteristics of the reference signal, interference between two or more reference signals (inter-aperture interference, intra-aperture interference, and/or the like), and/or the like. In some aspects, the beamforming information may be configured to be used to beamform data streams so that the interference is reduced.

In some aspects, the beamforming information may indicate one or more OAM mode groups, one or more combining coefficients for two or more non-orthogonal OAM modes associated with an OAM mode group, one or more group-specific coefficients associated with an OAM mode group, a modulation and coding scheme (MCS) value corresponding to at least one OAM mode group, and/or the like. In some aspects, the beamforming information may be based at least in part on the determined inter-aperture interference, the determined intra-aperture interference, and/or the like.

In some aspects, the receiver 410 may measure inter-aperture interference and determine one or more OAM groups based at least in part on the inter-aperture interference. In some aspects, the receiver 410 may determine the OAM mode groups based at least in part on a condition being satisfied. The condition may be satisfied based at least in part on an OAM mode group of the OAM mode groups including one OAM mode or a plurality of non-orthogonal OAM modes, an OAM mode of a first OAM mode group being orthogonal to an OAM mode of a second OAM mode group, or a combination thereof.

In some aspects, the OAM mode groups may include at least one OAM mode group having a low-order OAM mode and at least one OAM mode group having a high-order OAM mode. For example, in some aspects, the OAM modes shown in FIG. 3 may be grouped such that a first OAM mode group includes all of the channels (channel 2, channel 4, channel 6, and channel 8) having an OAM mode of l=3, a second OAM mode group that includes channel 1, a third OAM mode group that includes channel 3, a fourth OAM mode group that includes channel 5, a fifth OAM mode group that includes channel 7, and/or the like. In some aspects, an OAM mode group may be a beamformed port. The received signal of two OAM modes within one aperture pair are orthogonal, but due to energy divergence, the received signals of high-order OAM modes between two adjacent aperture pairs may be mutually interfered, while the low-order OAM modes between two adjacent aperture pairs still maintain orthogonality. Thus, grouping OAM modes in accordance with aspects described herein may facilitate orthogonality.

In some aspects, the beamforming information may indicate an index associated with an OAM mode. The index may indicate an OAM mode level corresponding to the OAM mode and an aperture pair identifier associated with the corresponding aperture pair. In some aspects, the beamforming information may indicate an order corresponding to the index and at least one additional index associated with at least one additional OAM mode. The order may be based at least in part on an order of mode levels within each aperture pair of the plurality of aperture pairs. In some aspects, the order may be based at least in part on an order of aperture pair identifiers corresponding to the plurality of aperture pairs.

For example, with reference to the modes depicted in FIG. 3, the order of the indexes may be based on the modes within each aperture: (aperture 1, mode 1), (aperture 1, mode 2), (aperture 2, mode 1), (aperture 2, mode 2), (aperture 3, mode 1), (aperture 3, mode 2), (aperture 4, mode 1), (aperture 4, mode 2). In some aspects, the indexes may be based on the OAM mode groups, and/or the like.

In some aspects, the beamforming information may include one or more combination coefficients for non-orthogonal modes in a group. In some aspects, a combining coefficient may be based at least in part on a plurality of channel gains associated with the two or more non-orthogonal OAM modes. The combining coefficient may include a conjugate value of a channel gain of the plurality of channel gains.

In some aspects, the receiver 410 may quantize an amplitude and a phase of a combining coefficient to generate a set of quantization bits, and may report the quantization bits to the transmitter 405 as part of the beamforming information. In some aspects, the receiver 410 may select, from a pre-configured codebook, a codeword that satisfies a similarity condition associated with the combining coefficient. The beamforming information may indicate an index associated with the codeword. In some aspects, the receiver 410 may determine a combining coefficient for a single OAM mode associated with an OAM mode group of a plurality of OAM mode groups. In some aspects, the combining coefficient may have a value of one. The receiver may refrain from including the combining coefficient in the beamforming information based at least in part on the combining coefficient having the value of one.

As shown by reference number 425, the receiver 410 may transmit, and the transmitter 405 may receive, a feedback message. The feedback message may include the beamforming information. As shown by reference number 430, the transmitter 405 may transmit, and the receiver 410 may receive, data streams that are beamformed based at least in part on the beamforming information.

As indicated above, FIG. 4 is provided as an example. Other examples may differ from what is described with regard to FIG. 4.

Figure 5:
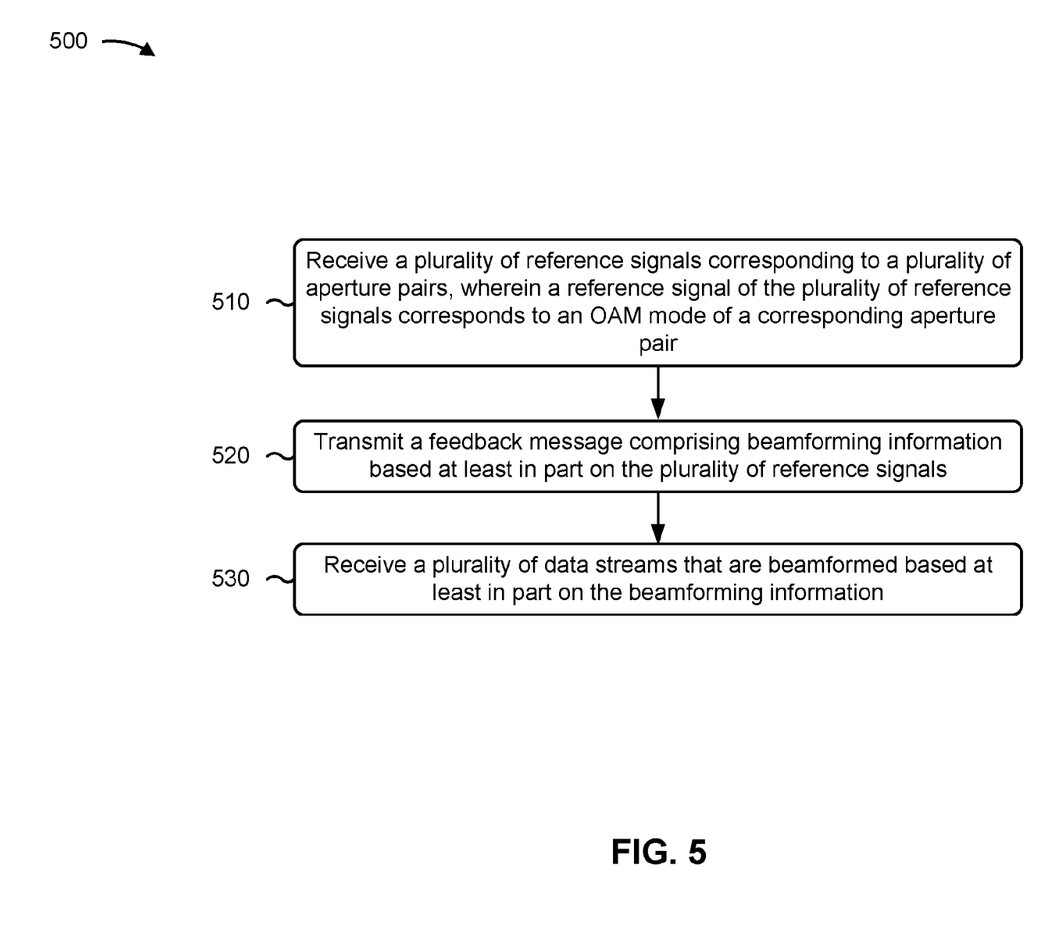
FIGS. 5 and 6 are diagrams illustrating example processes associated with beamforming for multi-aperture OAM multiplexing based communication, in accordance with various aspects of the present disclosure.

FIG. 5 is a diagram illustrating an example process 500 performed, for example, by a receiver, in accordance with various aspects of the present disclosure. Example process 500 is an example where the receiver (e.g., receiver 410 shown in FIG. 4, and/or the like) performs operations associated with beamforming for multi-aperture OAM multiplexing based communication.

As shown in FIG. 5, in some aspects, process 500 may include receiving, from a transmitter of the OAM multiplexing based communication, a plurality of reference signals corresponding to a plurality of aperture pairs, wherein a reference signal of the plurality of reference signals corresponds to an OAM mode of a corresponding aperture pair (block 510). For example, the receiver (e.g., using receive processor 238, receive processor 258, controller/processor 240, controller/processor 280, memory 242, memory 282, and/or the like) may receive, from a transmitter of the OAM multiplexing based communication, a plurality of reference signals corresponding to a plurality of aperture pairs, as described above. In some aspects, a reference signal of the plurality of reference signals corresponds to an OAM mode of a corresponding aperture pair.

As further shown in FIG. 5, in some aspects, process 500 may include transmitting, to the transmitter, a feedback message comprising beamforming information based at least in part on the plurality of reference signals (block 520). For example, the receiver (e.g., using transmit processor 220, transmit processor 264, controller/processor 240, controller/processor 280, memory 242, memory 282, and/or the like) may transmit, to the transmitter, a feedback message comprising beamforming information based at least in part on the plurality of reference signals, as described above.

As further shown in FIG. 5, in some aspects, process 500 may include receiving, from the transmitter, a plurality of data streams that are beamformed based at least in part on the beamforming information (block 530). For example, the receiver (e e.g., using receive processor 238, receive processor 258, controller/processor 240, controller/processor 280, memory 242, memory 282, and/or the like) may receive, from the transmitter, a plurality of data streams that are beamformed based at least in part on the beamforming information, as described above.

Process 500 may include additional aspects, such as any single aspect or any combination of aspects described below and/or in connection with one or more other processes described elsewhere herein.

In a first aspect, the beamforming information indicates at least one of a plurality of OAM mode groups, wherein an OAM mode group of the plurality of OAM mode groups comprises the OAM mode, a combining coefficient for two or more non-orthogonal OAM modes associated with an OAM mode group of the plurality of OAM mode groups, a group-specific coefficient associated with the OAM mode group, a modulation and coding scheme value corresponding to at least one OAM mode group of the plurality of OAM groups, or a combination thereof.

In a second aspect, alone or in combination with the first aspect, the beamforming information further indicates an index associated with the OAM mode.

In a third aspect, alone or in combination with one or more of the first and second aspects, the index indicates: an OAM mode level corresponding to the OAM mode, and an aperture pair identifier associated with the corresponding aperture pair.

In a fourth aspect, alone or in combination with one or more of the first through third aspects, the beamforming information indicates an order corresponding to the index and at least one additional index associated with at least one additional OAM mode.

In a fifth aspect, alone or in combination with one or more of the first through fourth aspects, the order is based at least in part on an order of mode levels within each aperture pair of the plurality of aperture pairs.

In a sixth aspect, alone or in combination with one or more of the first through fifth aspects, the order is further based at least in part on an order of aperture pair identifiers corresponding to the plurality of aperture pairs.

In a seventh aspect, alone or in combination with one or more of the first through sixth aspects, process 500 includes determining inter-aperture interference associated with two or more aperture pairs of the plurality of aperture pairs, determining intra-aperture interference associated with the corresponding aperture pair, or a combination thereof.

In an eighth aspect, alone or in combination with one or more of the first through seventh aspects, process 500 includes determining the beamforming information based at least in part on at least one of the inter-aperture interference, the intra-aperture interference, or a combination thereof.

In a ninth aspect, alone or in combination with one or more of the first through eighth aspects, process 500 includes determining a plurality of OAM mode groups based at least in part on a condition being satisfied.

In a tenth aspect, alone or in combination with one or more of the first through ninth aspects, the plurality of OAM mode groups comprises at least one OAM mode group having a low-order OAM mode, and at least one OAM mode group having a high-order OAM mode.

In an eleventh aspect, alone or in combination with one or more of the first through tenth aspects, the condition is satisfied based at least in part on at least one of an OAM mode group of the plurality of OAM mode groups comprising one OAM mode or a plurality of non-orthogonal OAM modes, an OAM mode of a first OAM mode group being orthogonal to an OAM mode of a second OAM mode group, or a combination thereof.

In a twelfth aspect, alone or in combination with one or more of the first through eleventh aspects, process 500 includes determining a combining coefficient for two or more non-orthogonal OAM modes associated with an OAM mode group of a plurality of OAM mode groups.

In a thirteenth aspect, alone or in combination with one or more of the first through twelfth aspects, the combining coefficient is based at least in part on a plurality of channel gains associated with the two or more non-orthogonal OAM modes.

In a fourteenth aspect, alone or in combination with one or more of the first through thirteenth aspects, the combining coefficient comprises a conjugate value of a channel gain of the plurality of channel gains.

In a fifteenth aspect, alone or in combination with one or more of the first through fourteenth aspects, the OAM mode group comprises a beamformed port.

In a sixteenth aspect, alone or in combination with one or more of the first through fifteenth aspects, process 500 includes quantizing an amplitude and a phase of the combining coefficient to generate a set of quantization bits, where the beamforming information indicates the set of quantization bits.

In a seventeenth aspect, alone or in combination with one or more of the first through sixteenth aspects, process 500 includes selecting, from a pre-configured codebook, a codeword that satisfies a similarity condition associated with the combining coefficient, where the beamforming information indicates an index associated with the codeword.

In an eighteenth aspect, alone or in combination with one or more of the first through seventeenth aspects, process 500 includes determining a combining coefficient for a single OAM mode associated with an OAM mode group of a plurality of OAM mode groups, where the combining coefficient has a value of one.

In a nineteenth aspect, alone or in combination with one or more of the first through eighteenth aspects, process 500 includes refraining from including the combining coefficient in the beamforming information based at least in part on the combining coefficient having the value of one.

In a twentieth aspect, alone or in combination with one or more of the first through nineteenth aspects, process 500 includes determining a group-specific coefficient associated with an OAM mode group of a plurality of OAM mode groups.

In a twenty first aspect, alone or in combination with one or more of the first through twentieth aspects, process 500 includes determining a modulation and coding scheme value corresponding to an OAM mode group of a plurality of OAM mode groups.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
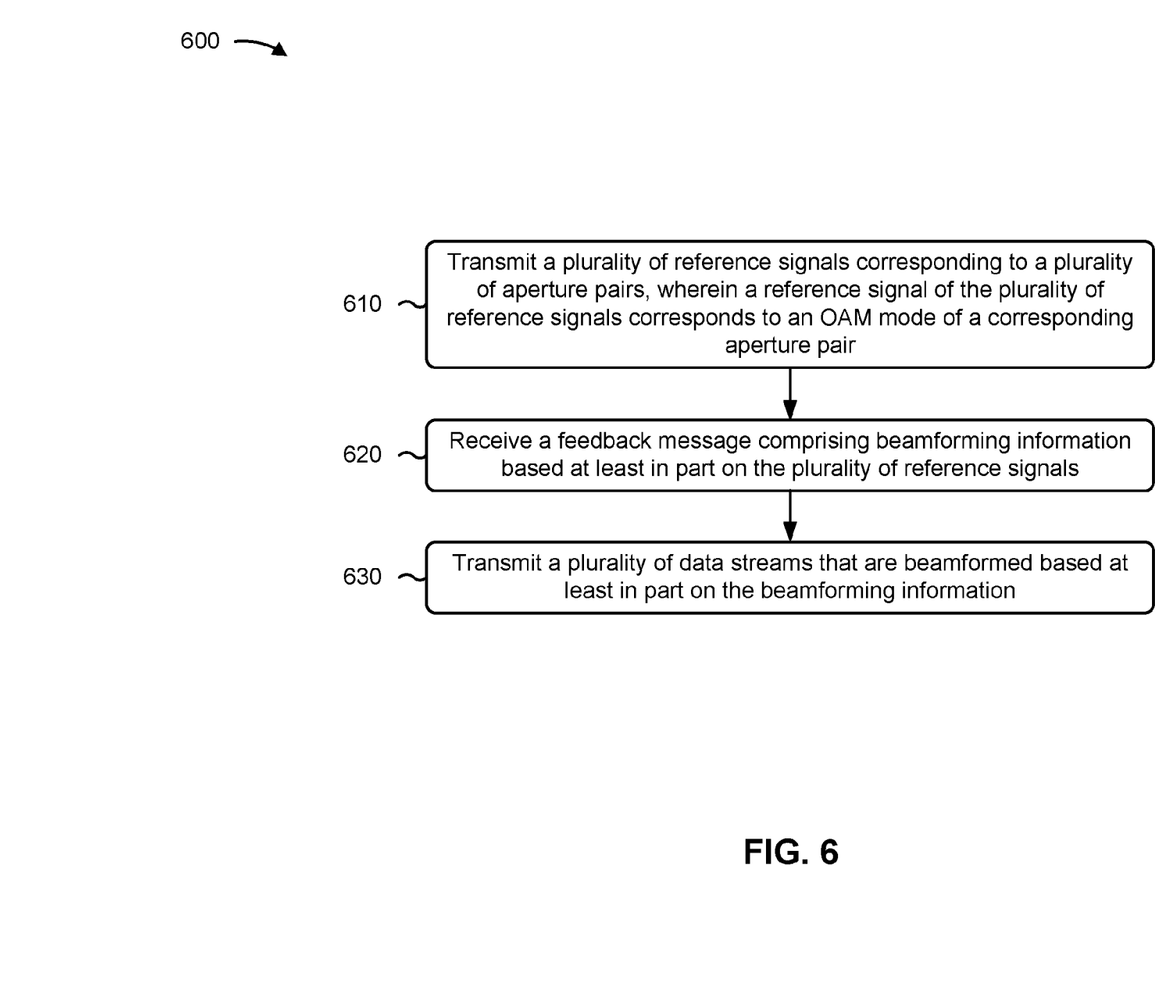

FIG. 6 is a diagram illustrating an example process 600 performed, for example, by a transmitter, in accordance with various aspects of the present disclosure. Example process 600 is an example where the transmitter (e.g., transmitter 410 shown in FIG. 4, and/or the like) performs operations associated with beamforming for multi-aperture OAM multiplexing based communication.

As shown in FIG. 6, in some aspects, process 600 may include transmitting, to a receiver of the OAM multiplexing based communication, a plurality of reference signals corresponding to a plurality of aperture pairs, wherein a reference signal of the plurality of reference signals corresponds to an OAM mode of a corresponding aperture pair (block 610). For example, the transmitter (e.g., using transmit processor 220, transmit processor 264, controller/processor 240, controller/processor 280, memory 242, memory 282, and/or the like) may transmit, to a receiver of the OAM multiplexing based communication, a plurality of reference signals corresponding to a plurality of aperture pairs, as described above. In some aspects, a reference signal of the plurality of reference signals corresponds to an OAM mode of a corresponding aperture pair.

As further shown in FIG. 6, in some aspects, process 600 may include receiving, from the receiver, a feedback message comprising beamforming information based at least in part on the plurality of reference signals (block 620). For example, the transmitter (e.g., using receive processor 238, receive processor 258, controller/processor 240, controller/processor 280, memory 242, memory 282, and/or the like) may receive, from the receiver, a feedback message comprising beamforming information based at least in part on the plurality of reference signals, as described above.

As further shown in FIG. 6, in some aspects, process 600 may include transmitting, to the receiver, a plurality of data streams that are beamformed based at least in part on the beamforming information (block 630). For example, the transmitter (e.g., using transmit processor 220, transmit processor 264, controller/processor 240, controller/processor 280, memory 242, memory 282, and/or the like) may transmit, to the receiver, a plurality of data streams that are beamformed based at least in part on the beamforming information, as described above.

Process 600 may include additional aspects, such as any single aspect or any combination of aspects described below and/or in connection with one or more other processes described elsewhere herein.

In a first aspect, the beamforming information indicates at least one of a plurality of OAM mode groups, wherein an OAM mode group of the plurality of OAM mode groups comprises the OAM mode, a combining coefficient for two or more non-orthogonal OAM modes associated with an OAM mode group of the plurality of OAM mode groups, a group-specific coefficient associated with the OAM mode group, a modulation and coding scheme value corresponding to at least one OAM mode group of the plurality of OAM groups, or a combination thereof.

In a second aspect, alone or in combination with the first aspect, the beamforming information further indicates an index associated with the OAM mode.

In a third aspect, alone or in combination with one or more of the first and second aspects, the index indicates an OAM mode level corresponding to the OAM mode and an aperture pair identifier associated with the corresponding aperture pair.

In a fourth aspect, alone or in combination with one or more of the first through third aspects, the beamforming information indicates an order corresponding to the index and at least one additional index associated with at least one additional OAM mode.

In a fifth aspect, alone or in combination with one or more of the first through fourth aspects, the order is based at least in part on an order of mode levels within each aperture pair of the plurality of aperture pairs.

In a sixth aspect, alone or in combination with one or more of the first through fifth aspects, the order is further based at least in part on an order of aperture pair identifiers corresponding to the plurality of aperture pairs.

In a seventh aspect, alone or in combination with one or more of the first through sixth aspects, the beamforming information is based at least in part on at least one of an inter-aperture interference associated with two or more aperture pairs of the plurality of aperture pairs, an intra-aperture interference associated with the corresponding aperture pair, or a combination thereof.

In an eighth aspect, alone or in combination with one or more of the first through seventh aspects, the beamforming information indicates a plurality of OAM mode groups based at least in part on a condition being satisfied.

In a ninth aspect, alone or in combination with one or more of the first through eighth aspects, the plurality of OAM mode groups comprises at least one OAM mode group having a low-order OAM mode and at least one OAM mode group having a high-order OAM mode.

In a tenth aspect, alone or in combination with one or more of the first through ninth aspects, the condition is satisfied based at least in part on at least one of an OAM mode group of the plurality of OAM mode groups comprising one OAM mode or a plurality of non-orthogonal OAM modes, an OAM mode of a first OAM mode group being orthogonal to an OAM mode of a second OAM mode group, or a combination thereof.

In an eleventh aspect, alone or in combination with one or more of the first through tenth aspects, the beamforming information indicates a combining coefficient for two or more non-orthogonal OAM modes associated with an OAM mode group of a plurality of OAM mode groups.

In a twelfth aspect, alone or in combination with one or more of the first through eleventh aspects, the combining coefficient is based at least in part on a plurality of channel gains associated with the two or more non-orthogonal OAM modes.

In a thirteenth aspect, alone or in combination with one or more of the first through twelfth aspects, the combining coefficient comprises a conjugate value of a channel gain of the plurality of channel gains.

In a fourteenth aspect, alone or in combination with one or more of the first through thirteenth aspects, the OAM mode group comprises a beamformed port.

In a fifteenth aspect, alone or in combination with one or more of the first through fourteenth aspects, the beamforming information indicates a set of quantization bits, and the set of quantization bits are based at least in part on quantization of an amplitude and a phase of the combining coefficient.

In a sixteenth aspect, alone or in combination with one or more of the first through fifteenth aspects, the beamforming information indicates an index associated with a codeword, where the codeword is selected from a pre-configured codebook and satisfies a similarity condition associated with the combining coefficient.

In a seventeenth aspect, alone or in combination with one or more of the first through sixteenth aspects, the beamforming information does not indicate a combining coefficient for a single OAM mode associated with an OAM mode group of a plurality of OAM mode groups, where the combining coefficient has a value of one.

In an eighteenth aspect, alone or in combination with one or more of the first through seventeenth aspects, the beamforming information does not indicate the combining coefficient in the beamforming information based at least in part on the combining coefficient having a value of one.

In a nineteenth aspect, alone or in combination with one or more of the first through eighteenth aspects, the beamforming information indicates a group-specific coefficient associated with an OAM mode group of a plurality of OAM mode groups.

In a twentieth aspect, alone or in combination with one or more of the first through nineteenth aspects, the beamforming information indicates a modulation and coding scheme value corresponding to an OAM mode group of a plurality of OAM mode groups.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a receiver of orbital angular momentum (OAM) multiplexing based communication, comprising: receiving, from a transmitter of the OAM multiplexing based communication, a plurality of reference signals corresponding to a plurality of aperture pairs, wherein a reference signal of the plurality of reference signals corresponds to an OAM mode of a corresponding aperture pair; transmitting, to the transmitter, a feedback message comprising beamforming information based at least in part on the plurality of reference signals; and receiving, from the transmitter, a plurality of data streams that are beamformed based at least in part on the beamforming information.

2. The method of claim 1, wherein the beamforming information indicates at least one of: a plurality of OAM mode groups, wherein an OAM mode group of the plurality of OAM mode groups comprises the OAM mode, a combining coefficient for two or more non-orthogonal OAM modes associated with an OAM mode group of the plurality of OAM mode groups, a group-specific coefficient associated with the OAM mode group, a modulation and coding scheme value corresponding to at least one OAM mode group of the plurality of OAM groups, or a combination thereof.

3. The method of claim 2, wherein the beamforming information further indicates an index associated with the OAM mode.

4. The method of claim 3, wherein the index indicates: an OAM mode level corresponding to the OAM mode, and an aperture pair identifier associated with the corresponding aperture pair.

5. The method of claim 3, wherein the beamforming information indicates an order corresponding to the index and at least one additional index associated with at least one additional OAM mode.

6. The method of claim 1, further comprising: determining inter-aperture interference associated with two or more aperture pairs of the plurality of aperture pairs, determining intra-aperture interference associated with the corresponding aperture pair, or a combination thereof.

7. The method of claim 1, further comprising determining a combining coefficient for two or more non-orthogonal OAM modes associated with an OAM mode group of a plurality of OAM mode groups.

8. The method of claim 1, further comprising determining a combining coefficient for a single OAM mode associated with an OAM mode group of a plurality of OAM mode groups, wherein the combining coefficient has a value of one.

9. The method of claim 1, further comprising determining a group-specific coefficient associated with an OAM mode group of a plurality of OAM mode groups or a modulation and coding scheme value corresponding to an OAM mode group of a plurality of OAM mode groups.

10. A method of wireless communication performed by a transmitter of orbital angular momentum (OAM) multiplexing based communication, comprising: transmitting, to a receiver of the OAM multiplexing based communication, a plurality of reference signals corresponding to a plurality of aperture pairs, wherein a reference signal of the plurality of reference signals corresponds to an OAM mode of a corresponding aperture pair; receiving, from the receiver, a feedback message comprising beamforming information based at least in part on the plurality of reference signals; and transmitting, to the receiver, a plurality of data streams that are beamformed based at least in part on the beamforming information.

11. The method of claim 10, wherein the beamforming information indicates at least one of: a plurality of OAM mode groups, wherein an OAM mode group of the plurality of OAM mode groups comprises the OAM mode, a combining coefficient for two or more non-orthogonal OAM modes associated with an OAM mode group of the plurality of OAM mode groups, a group-specific coefficient associated with the OAM mode group, a modulation and coding scheme value corresponding to at least one OAM mode group of the plurality of OAM groups, or 37 a combination thereof.

12. The method of claim 11, wherein the beamforming information further indicates an index associated with the OAM mode.

13. The method of claim 12, wherein the index indicates: an OAM mode level corresponding to the OAM mode, and an aperture pair identifier associated with the corresponding aperture pair.

14. The method of claim 12, wherein the beamforming information indicates an order corresponding to the index and at least one additional index associated with at least one additional OAM mode.

15. The method of claim 10, wherein the beamforming information is based at least in part on at least one of: an inter-aperture interference associated with two or more aperture pairs of the plurality of aperture pairs, an intra-aperture interference associated with the corresponding aperture pair, or a combination thereof.

16. The method of claim 10, wherein the beamforming information indicates a plurality of OAM mode groups based at least in part on a condition being satisfied.

17. The method of claim 10, wherein the beamforming information indicates a combining coefficient for two or more non-orthogonal OAM modes associated with an OAM mode group of a plurality of OAM mode groups.

18. The method of claim 10, wherein the beamforming information does not indicate a combining coefficient for a single OAM mode associated with an OAM mode group of a plurality of OAM mode groups, wherein the combining coefficient has a value of one.

19. The method of claim 10, wherein the beamforming information indicates a group-specific coefficient associated with an OAM mode group of a plurality of OAM mode groups or a modulation and coding scheme value corresponding to an OAM mode group of a plurality of OAM mode groups.

20. A receiver of orbital angular momentum (OAM) multiplexing based communication, comprising: a memory; and one or more processors, coupled to the memory, configured to: receive, from a transmitter of the OAM multiplexing based communication, a plurality of reference signals corresponding to a plurality of aperture pairs, wherein a reference signal of the plurality of reference signals corresponds to an OAM mode of a corresponding aperture pair; transmit, to the transmitter, a feedback message comprising beamforming information based at least in part on the plurality of reference signals; and 39 receive, from the transmitter, a plurality of data streams that are beamformed based at least in part on the beamforming information.

21. The receiver of claim 20, wherein the beamforming information indicates at least one of: a plurality of OAM mode groups, wherein an OAM mode group of the plurality of OAM mode groups comprises the OAM mode, a combining coefficient for two or more non-orthogonal OAM modes associated with an OAM mode group of the plurality of OAM mode groups, a group-specific coefficient associated with the OAM mode group, a modulation and coding scheme value corresponding to at least one OAM mode group of the plurality of OAM groups, or a combination thereof.

22. The receiver of claim 21, wherein the beamforming information further indicates an index associated with the OAM mode.

23. The receiver of claim 22, wherein the index indicates: an OAM mode level corresponding to the OAM mode, and an aperture pair identifier associated with the corresponding aperture pair.

24. The receiver of claim 22, wherein the beamforming information indicates an order corresponding to the index and at least one additional index associated with at least one additional OAM mode.

25. The receiver of claim 20, wherein the one or more processors are further configured to: determine inter-aperture interference associated with two or more aperture pairs of the plurality of aperture pairs, determine intra-aperture interference associated with the corresponding aperture pair, or a combination thereof.

26. The receiver of claim 20, wherein the one or more processors are further configured to determine a combining coefficient for two or more non-orthogonal OAM modes associated with an OAM mode group of a plurality of OAM mode groups.

27. The receiver of claim 20, wherein the one or more processors are further configured to determine a combining coefficient for a single OAM mode associated with an OAM mode group of a plurality of OAM mode groups, wherein the combining coefficient has a value of one.

28. The receiver of claim 20, wherein the one or more processors are further configured to determine a group-specific coefficient associated with an OAM mode group of a plurality of OAM mode groups or a modulation and coding scheme value corresponding to an OAM mode group of a plurality of OAM mode groups.

29. A transmitter of orbital angular momentum (OAM) multiplexing based communication, comprising: a memory; and 41 one or more processors, coupled to the memory, configured to: transmit, to a receiver of the OAM multiplexing based communication, a plurality of reference signals corresponding to a plurality of aperture pairs, wherein a reference signal of the plurality of reference signals corresponds to an OAM mode of a corresponding aperture pair; receive, from the receiver, a feedback message comprising beamforming information based at least in part on the plurality of reference signals; and transmit, to the receiver, a plurality of data streams that are beamformed based at least in part on the beamforming information.

30. The transmitter of claim 29, wherein the beamforming information indicates at least one of: a plurality of OAM mode groups, wherein an OAM mode group of the plurality of OAM mode groups comprises the OAM mode, a combining coefficient for two or more non-orthogonal OAM modes associated with an OAM mode group of the plurality of OAM mode groups, a group-specific coefficient associated with the OAM mode group, a modulation and coding scheme value corresponding to at least one OAM mode group of the plurality of OAM groups, or a combination thereof.

31. The transmitter of claim 30, wherein the beamforming information further indicates an index associated with the OAM mode.

32. The transmitter of claim 31, wherein the index indicates: 42 an OAM mode level corresponding to the OAM mode, and an aperture pair identifier associated with the corresponding aperture pair.

33. The transmitter of claim 31, wherein the beamforming information indicates an order corresponding to the index and at least one additional index associated with at least one additional OAM mode.

34. The transmitter of claim 29, wherein the beamforming information is based at least in part on at least one of: an inter-aperture interference associated with two or more aperture pairs of the plurality of aperture pairs, an intra-aperture interference associated with the corresponding aperture pair, or a combination thereof.

35. The transmitter of claim 29, wherein the beamforming information indicates a plurality of OAM mode groups based at least in part on a condition being satisfied.

* * * * *